United States Patent [19]
Nickl et al.

[11] 3,920,668
[45] Nov. 18, 1975

[54] ANTIPHLOGISTIC 1-(HYDROXY OR CARBOXYLIC ACYLOXY)-3-(2'-HALO-4-BIPHENYLYL)

[75] Inventors: Josef Nickl; Helmut Teufel; Wolfhard Engel; Ernst Seeger; Gunther Engelhardt, all of Biberach an der Riss, Germany

[73] Assignee: Boehringer Ingelheim GmbH, Ingelheim am Rhein, Germany

[22] Filed: May 29, 1974

[21] Appl. No.: 474,181

[30] Foreign Application Priority Data
June 7, 1973  Germany............................ 2328973

[52] U.S. Cl....... 260/295 R; 260/295.5 R; 260/468; 260/473; 260/590; 424/263; 424/266; 424/308; 424/311; 424/331
[51] Int. Cl.[2]................. C07D 213/30; A61K 31/44
[58] Field of Search.................. 260/295 R, 295.5 R

[56] References Cited
OTHER PUBLICATIONS
Hoppe–Seyler's Zeitschrift fur Physiologische Chemie 290, 61–63 (1952).
Logemann, Chemical Abstracts 49:1751h (1955).
Chemical Abstracts 53:9189h (1959).

Primary Examiner—Norman A. Drezin
Attorney, Agent, or Firm—Hammond & Littell

[57] ABSTRACT
Compounds of the formula

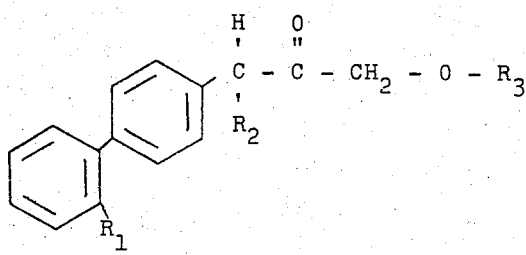

wherein
$R_1$ is hydrogen or halo,
$R_2$ is hydrogen or lower alkyl of 1 to 3 carbon atoms and
$R_3$ is hydrogen or organic acyl, with the proviso that $R_1$ and $R_2$ are not hydrogen at the same time, if $R_3$ is hydrogen or acetyl, or
optically active antipodes thereof; the compounds as well as their optically active antipodes are useful as antiphlogistics with a surprisingly small ulcerogenic side effect.

2 Claims, No Drawings

ANTIPHLOGISTIC 1-(HYDROXY OR CARBOXYLIC ACYLOXY)-3-(2'-HALO-4-BIPHENYLYL)

This invention relates to novel 1-(hydroxy or acyloxy)-3-biphenylyl-(2)-ones, optically active antipodes thereof, as well as to a process for preparing these compounds.

More particularly, the present invention relates to novel compounds of the formula

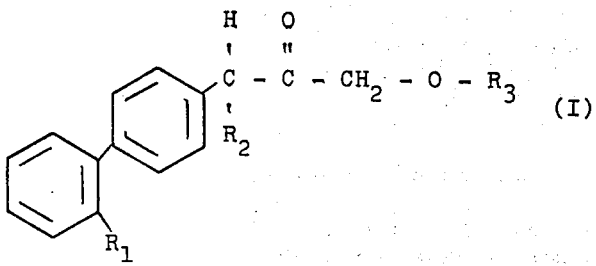

wherein
$R_1$ is hydrogen or halo,
$R_2$ is hydrogen or lower alkyl of 1 to 3 carbon atoms and
$R_3$ is hydrogen or organic acyl, with the proviso that $R_1$ and $R_2$ are not hydrogen at the same time, if
$R_3$ is hydrogen or acetyl, or
optically active antipodes thereof.

A particularly preferred subgenus of the compounds according to the invention are those compounds of the formula

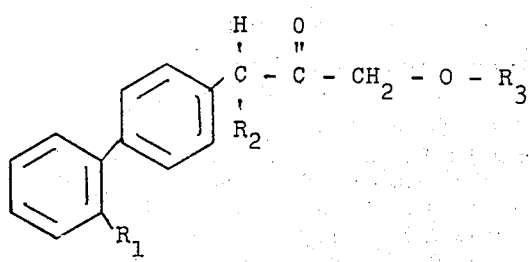

wherein
$R_1$ is hydrogen or halo,
$R_2$ is hydrogen or lower alkyl of 1 to 3 carbon atoms and
$R_3$ is hydrogen, acetyl, propionyl, butyryl, isobutyryl, pivaloyl, valeroyl, isovaleroyl, caprinoyl, caproyl, capryl, undecanoyl, benzoyl, nicotinoyl, isonicotinoyl or benzofurancarbonyl, with the proviso that $R_1$ and $R_2$ are not hydrogen at the same time, if $R_3$ is hydrogen or acetyl, or optically active antipodes thereof.

The novel compounds unbraced by formula I may be prepared by the following processes:

Method A

By hydrolyzing an enol ether of the formula

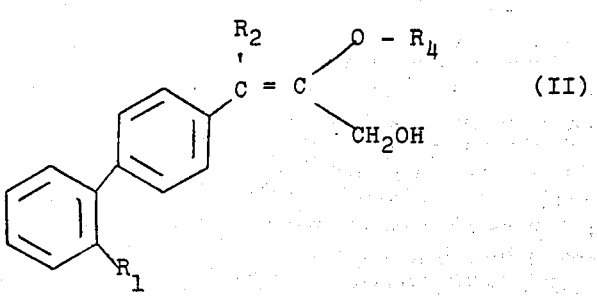

wherein $R_1$ and $R_2$ have the same meanings as defined above and
$R_4$ is alkyl, aryl or aralkyl
in the presence of an acid.

The hydrolysis is effected in the presence of an acid, preferably in the presence of a mineral acid such as hydrochloric acid or phosphoric acid, appropriately in a solvent which can be mixed with water, for example, methanol, ethanol, tetrahydrofuran or dioxane, and at temperatures up to the boiling point of the solvent used, preferably, however, at temperatures from 20° to 50°C. A compound of the formula II is conveniently used as cis, trans-mixture.

Method B

By decomposing a diazomethyl-ketone of the formula

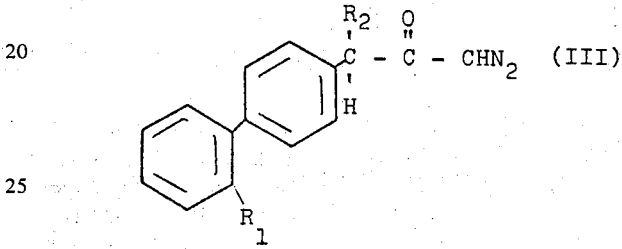

wherein $R_1$ and $R_2$ have the same meanings as defined above in the presence of an acid.

The reaction is conveniently performed in the presence of a solvent which can be mixed with water, such as tetrahydrofuran or dioxane, and at temperatures up to the boiling point of the solvent used, preferably, however, at temperatures from 50° to 100°C, in the presence of an acid.

If the reaction is performed in the presence of a mineral acid such as sulfuric acid or phosphoric acid, a compound of formula I is obtained, wherein $R_3$ is hydrogen.

If the reaction is carried out in the presence of an organic acid of the formula $$R_3' — OH \qquad (IV)$$

wherein $R_3'$ has the same meanings as $R_3$ as defined above except that $R_3'$ cannot be hydrogen, optionally in the presence of a catalyst, such as copper (II) chloride, whereby the used organic acid of formula IV or also an inert solvent such as benzene may serve as solvent, a corresponding compound of formula I is obtained, wherein $R_3$ has the same meanings as defined above, except that $R_3$ cannot be hydrogen.

If according to Method A or Method B a compound of formula I is obtained, wherein $R_3$ is acyl, this acyl may be split off, if desired, by means of hydrolysis, and/or a compound of formula I, wherein $R_3$ is hydrogen, this compound may be converted into the corresponding acyl derivative of formula I by means of subsequent acylation, for example, with the corresponding acid halide, acid anhydride or with the corresponding acid in the presence of a chloroformic acid ester, preferably in the presence of an acid binding agent, such as triethylamine or pyridine.

The compounds of formulas II and III used as starting materials are obtained according to known processes. The enol ethers of formula II are, for example, obtained by reaction of a corresponding biphenyl ketone with a corresponding phosphono ester in the presence of a base (see Liebigs, Ann. Chem. 699, p. 53 (1966)), and by subsequent reduction of the obtained ester with lithium aluminum hydride.

The diazomethyl-ketones of formula III are obtained by reaction of the corresponding biphenylyl-acetyl halides with diazomethane.

The following examples further illustrate the present invention and will enable others skilled in the art to understand it more completely. It should be understood, however, that the invention is not limited solely to the particular examples given below.

The thin-layer chromatograms were carried out on preprepared silica gel plates Polygram SIL G/UV of Macherey, Nagel & Co., if not otherwise stated.
Preparation of starting compounds:

EXAMPLE 1

Ethyl cis, trans-2-ethoxy-3-(2'-fluoro-4''-biphenylyl)-butenate-(2)

18.6 gm (0.165 mol) of potassium tert.-butylate, suspended in 150 ml of glycol dimethylether, were mixed while stirring with 44.2 gm (0.165 mol) of ethyl 2-diethylphosphono-2-ethoxy-acetate and, after the carbanion had formed, 32.1 gm (0.15 mol) of 2'-fluoro-4-acetyl-biphenyl were added, whereby the mixture heated itself up to 50°C while darkening. Then, the mixture was heated up to 80°C for 2 hours. After standing overnight, the solvent was removed in vacuo. The residue was mixed with water, the mixture was acidified and extracted with ether. The ether extract was washed, dried and evaporated. The oil was distilled for further purification, the yield was 37.1 gm, and the boiling point at 0.6 mm Hg was 170°–173°C.
$R_f$-value: 0.7 (ethylenechloride/ethyl acetate/glacial acetic acid = 100/30/5),
$R_f$-value: 0.29 and 0.37 (benzene) on Woelm-preprepared silica gel plates F 254/366.

EXAMPLE 2

Cis, trans-1-hydroxy-2-ethoxy-3-(2'-fluoro-4''-biphenylyl)-butene-(2)

37.1 gm of ethyl cis, trans-2-ethoxy-3-(2'-fluoro-4''-biphenylyl)-butenate-(2), dissolved in 80 ml of dry ether, was added at −60°C to 5.2 gm (0.137 mol) of lithium aluminum hydride in 350 ml of absolute ether. Afterwards, the temperature was allowed to rise to 0°C and 15 ml of ethyl acetate, 5.2 ml of water, 5.2 ml of 2N sodium hydroxide solution and 15.5 ml of water were subsequently added to the reaction mixture. The organic precipitate was vacuum filtered and the ether solution was evaporated to yield 33.7 gm of oil.
$R_f$-value: 0.4 and 0.56 (benzene/ethyl acetate = 8/2) on Woelm-preprepared silica gel plates F 254/366.

EXAMPLE 3

Using a procedure analogous to that described in Example 2, cis-trans-1-hydroxy-2-ethoxy-3-(4'-biphenylyl)-propene-(2) oil, $R_f$-value: 0.1 – 0.2 (benzene), was prepared from ethyl cis, trans-2-ethoxy-3-(4'-biphenylyl)-acrylate, m.p. 52° to 59°C.

EXAMPLE 4

Using a procedure analogous to that described in Example 2, cis, trans-1-hydroxy-2-ethoxy-3-(2'-fluoro-4''-biphenylyl)propene-(2) oil, $R_f$-value: 0.7 (benzene/ethyl acetate = 2/1), was prepared from ethyl cis, trans-2-ethoxy-3-(2'-fluoro-4''-biphenylyl)-acrylate oil, $R_f$-value: 0.4 (benzene/cyclohexane = 1:1).

EXAMPLE 5

Using a procedure analogous to that described in Example 2, cis, trans-1-hydroxy-2-ethoxy-3-(4'-biphenylyl)-butene-(2) oil, $R_f$-value: 0.4 – 0.5 (ethylenechloride/glacial acetic acid/ethyl acetate = 100/5/30), was prepared from ethyl cis, trans-2-ethoxy-3-(4'-biphenylyl)-butenate-(2) oil, b.p. of 155°–160°C at 0.25 mm Hg.

EXAMPLE 6

Using a procedure analogous to that described in Example 2, cis, trans-1-hydroxy-2-ethoxy-3-(2'-chloro-4''-biphenylyl)-butene-(2) oil, $R_f$-value: 0.1 – 0.2 (benzene), was prepared from ethyl 2-ethoxy-3-(2'-chloro-4''-biphenylyl)-butenate-(2), b.p. 200°–205°C at 0.6 mm Hg.

EXAMPLE 7

Using a procedure analogous to that described in Example 2, cis, trans-1-hydroxy-2-ethoxy-3-(4'-biphenylyl)-pentene-(2) crystalline solidifying oil, $R_f$-value: 0.2 (benzene), was prepared from ethyl cis, trans-2-ethoxy-3-(4'-biphenylyl)-pentenate-(2), b.p. 165°–180°C at 0.6 mm Hg.

Preparation of compounds according to the invention:

EXAMPLE 8

1-Hydroxy-3-(2'-fluoro-4''-biphenylyl)-butanone-(2) by Method A 32.3 gm of 1-hydroxy-2-ethoxy-3-(2'-fluoro-4''-biphenylyl)-butene-(2), dissolved in 50 ml of ethanol, were mixed with 4 ml of 85% phosphoric acid and with 25 ml of water and heated for 8 hours at 50°C. The reaction product precipitated with water was extracted with ethyl acetate and chromatographically purified on 1200 gm of silica gel (grain size: 0.05 to 0.2 mm; activity stage I) with benzene/ethyl acetate = 4/1, after washing, drying and evaporating. After a preliminary run, the fractions having an $R_f$-value of 0.6 were collected. 24.6 gm (84.3% of theory) were obtained as an oil, having the formula

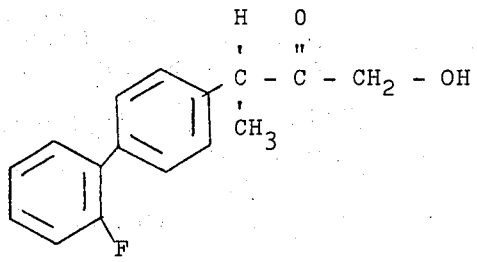

Elemental Analysis: $C_{16}H_{15}FO_2$ (258.3) Calculated: C - 74.40%; H - 5.85% Found: C - 74.50%; H - 5.92%

EXAMPLE 9

Using a procedure analogous to that described in Example 8, 1-hydroxy-3-(2'-fluoro-4''-biphenylyl)-propanone-(2) was prepared in a yield of 71% of theory by hydrolysis of 1-hydroxy-2-ethoxy-3-(2'-fluoro-4''-biphenylyl)-propene-(2). The compound was a wax-like substance with an $R_f$-value of 0.7 (benzene/ethyl acetate = 2/1), of the formula

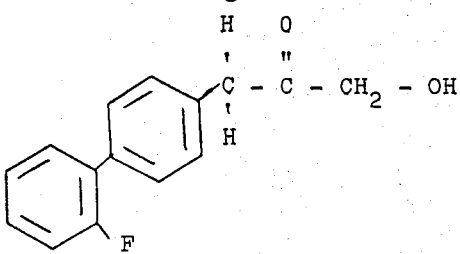

Elemental analysis: $C_{15}H_{13}FO_2$ (244.27) Calculated: C - 73.76%; H - 5.36% Found: C - 74.20%; H - 5.60%

EXAMPLE 10

Using a procedure analogous to that described in Example 8, 1-hydroxy-3-(4'-biphenylyl)-butanone-(2), m.p. 86°–88°C (from cyclohexane), was prepared in a yield of 74% of theory by hydrolysis of 1-hydroxy-2-ethoxy-3-(4'-biphenylyl)-butene-(2), and had the formula

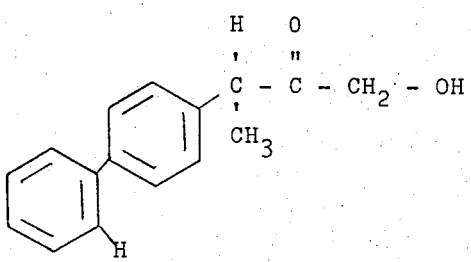

Elemental analysis: $C_{16}H_{18}O_2$ (242.32) Calculated: C - 79.30%; H - 7.49% Found: C - 80.20%; H - 7.00%

EXAMPLE 11

Using a procedure analogous to that described in Example 8, 1-hydroxy-3-(2'-chloro-4''-biphenylyl)-butanone-(2) was prepared in a yield of 87% of theory by hydrolysis of 1-hydroxy-2-ethoxy-3-(2'-chloro-4''-biphenylyl)-butene-(2). The compound was an oil with an $R_f$-value of 0.5 (benzene/ethyl acetate = 1/1), of the formula

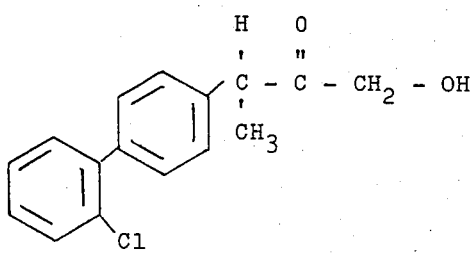

Elemental analysis: $C_{16}H_{15}ClO_2$ (274.76) Calculated: C - 69.94%; H - 5.50%; Cl - 12.91% Found: C - 70.20%; H - 5.68%; Cl - 12.65%

EXAMPLE 12

Using a procedure analogous to that described in Example 8, 1-hydroxy-3-(4'-biphenylyl)-pentanone-(2), m.p. 107°–108°C (from cyclohexane), was prepared in a yield of 18% of theory by hydrolysis of 1-hydroxy-2-ethoxy-3-(4'-biphenylyl)-pentene-(2), and had the formula

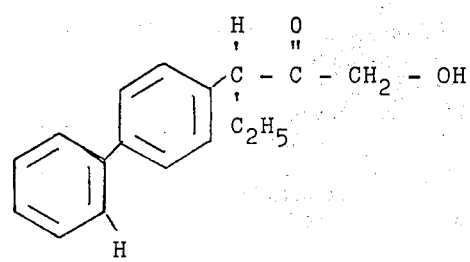

Elemental analysis: $C_{17}H_{18}O_2$ (254.33) Calculated: C - 80.28%; H - 7.14% Found: C - 80.30%; H - 7.42%

EXAMPLE 13

1-Isonicotinoyloxy-3-(2'-fluoro-4''-biphenylyl)-butanone-(2)

9.1 gm (0.04 mol) of isonicotinic acid anhydride were added to a solution of 8.2 gm (0.0318 mol) of 1-hydroxy-3-(2'-fluoro-4''-biphenylyl)-butanone-(2) in 50 ml of dry pyridine. The mixture was stirred for a further 2 hours at room temperature under exclusion of moisture; 150 ml of water were added; and the reaction product was extracted with ethyl acetate. The organic layer was washed thoroughly with water to remove the pyridine, dried and evaporated. The residue, a crystalline oil, was recrystallized from 30 ml of isopropanol, m.p. 95°–97°C, in a yield of 7.8 gm (68% of theory), of the formula

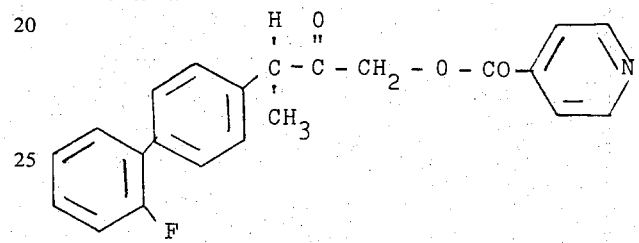

Elemental analysis: $C_{22}H_{18}FNO_3$ (363.35) Calculated: C - 72.71%; H - 4.99%; N - 3.86% Found: C - 72.90%; H - 5.10% N - 3.99%

EXAMPLE 14

Using a procedure analogous to that described in Example 13, 1-isonicotinoyloxy-3-(4'-biphenylyl)-butanone-(2), m.p. 89°–90°C (from ethanol), was prepared in a yield of 80% of theory, from 1-hydroxy-3-(4'-biphenylyl)-butanone-(2) and isonicotinic acid anhydride in pyridine.

EXAMPLE 15

Using a procedure analogous to that described in Example 13, 1-isonicotinoyloxy-3-(2'-chloro-4''-biphenylyl)-butanone-(2), was prepared in a yield of 78% of theory from 1-hydroxy-3-(2'-chloro-4''biphenylyl)-butanone-(2) and isonicotinic acid anhydride. The compound was purified by column chromatography on silica gel with benzene/ethyl acetate = 3/1, and was an oil with $R_f$-value: 0.3 (benzene/ethyl acetate = 3/1).

Elemental analysis: $C_{22}H_{13}ClNo_3$ (379.85) Calculated: C - 69.58%; H - 4.77%; N - 3.69%; Cl - 9.33% Found: C - 70.30%; H - 5.17%; N - 3.48%; Cl - 8.44%

EXAMPLE 16

Using a procedure analogous to that described in Example 13, 1-nicotinoyloxy-3-(2'-fluoro-4''-biphenylyl)-butanone-(2), m.p. 89°–90°C (from isopropanol), was prepared in a yield of 81% of theory, from 1-hydroxy-3-(2'-fluoro-4''-biphenylyl)-butanone-(2) and nicotinoylchloride hydrochloride in pyridine, and had the formula

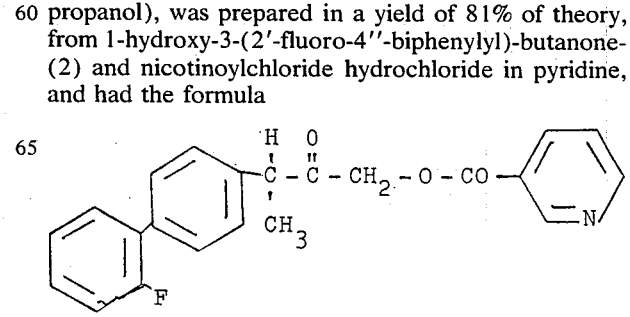

Elemental analysis: $C_{22}H_{18}FNO_3$ (363.35) Calculated: C - 72.71%; H - 4.99%; N - 3.86% Found: C - 72.70%; H - 5.27%; N - 3.88%

EXAMPLE 17

1-Acetoxy-3-(2'-fluoro-4''-biphenylyl)-butanone-(2)

3.0 gm (38 mmol) of acetylchloride were added at 8°–14°C to a solution of 8.2 gm (31.8 mmol) of pure 1-hydroxy-3-(2'-fluoro-4''-biphenylyl)-butanone-(2) in 75 ml of dry pyridine. The mixture was stirred for 1 hour, diluted with ice-water, acidified and the reaction product was extracted with ethyl acetate. The ethyl acetate layer was washed with 2N hydrochloric acid, sodium carbonate and water, dried and evaporated. The residue was recrystallized from 35 ml of methanol; and 6.5 gm (68% of theory) were obtained, m.p. 87°–89°C, of the formula

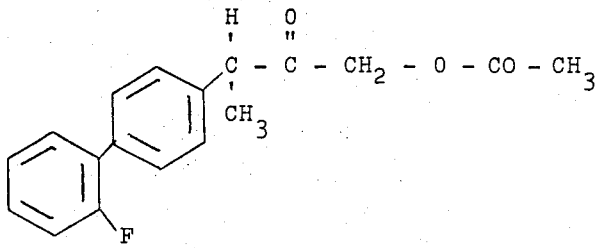

Elemental analysis: $C_{18}H_{17}FO_3$ (300.22) Calculated: C - 71.98%; H - 5.71% Found: C - 72.20%; H - 5.76%

EXAMPLE 18

Using a procedure analysis to that described in Example 17, 1-pivaloyloxy-3-(2'-fluoro-4''-biphenylyl)-butanone-(2), m.p. 87°–89°C (from isopropanol), was prepared in a yield of 71% of theory, from 1-hydroxy-3-(2'-fluoro-4''-biphenylyl)-butanone-(2) and pivalic acid chloride, and had the formula

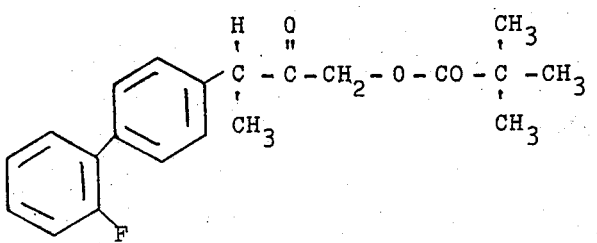

Elemental analysis: $C_{21}H_{23}FO_3$ (342.39) Calculated: C - 73.66%; H - 6.77% Found: C - 73.90%; H - 6.80%

EXAMPLE 19

Using a procedure analogous to that described in Example 17, 1-isobutyryloxy-3-(2'-fluoro-4''-biphenylyl)-butanone-(2) was prepared in a yield of 90% of theory from 1-hydroxy-3-(2'-fluoro-4''-biphenylyl)-butanone-(2) and isobutyric acid chloride. The compound was an oil, $R_f$-value: 0.7 (ethylene chloride/ethyl acetate/glacial acetic acid = 100/30/5 on Woelm-prepared silica gel plates F 254/366), and had the formula

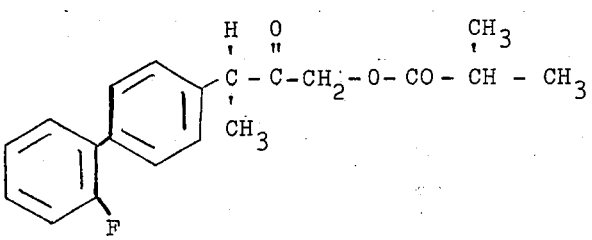

Elemental analysis: $C_{20}H_{21}FO_3$ (328.39) Calculated: C - 73.15%; H - 6.45% Found: C - 73.50%; H - 6.45%

EXAMPLE 20

Using a procedure analogous to that described in Example 17, 1-valeryloxy-3-(2'-fluoro-4''-biphenylyl)-butanone-(2) was prepared in a yield of 86% of theory from 1-hydroxy-3-(2'-fluoro-4''-biphenylyl)-butanone-(2) and valeric acid chloride. The compound was an oil, $R_f$-value: 0.7 (ethylene chloride/ethyl acetate/glacial acetic acid = 100/30/5 on Woelm-preprepared silica gel plates F 254/366), of the formula

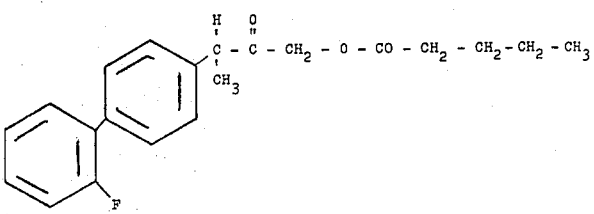

Elemental analysis: $C_{21}H_{23}FO_3$ (342.41) Calculated: C - 73.26%; H - 6.77% Found: C - 71.20%; H - 6.61%

EXAMPLE 21

Using a procedure analogous to that described in Example 17, 1-acetoxy-3-(4'-biphenylyl)-butanone-(2), m.p. 109°–111°C (from methanol), was prepared in a yield of 86% of theory from 1-hydroxy-3(4'-biphenylyl)-butanone-(2) and acetylchloride.

Elemental analysis: $C_{18}H_{18}O_3$ (282.34) Calculated: C - 76.60%; H - 6.42% Found: C - 76.70%; H - 6.50%

EXAMPLE 22

Using a procedure analogous to that described in Example 17, 1-pivaloyloxy-3-(4'-biphenylyl)-butanone-(2), m.p. 75°–77°C (from ethanol), was prepared in a yield of 88% of theory, from 1-hydroxy-3-(4'-biphenylyl)-butanone-(2) and pivalic acid chloride.

Elemental analysis: $C_{21}H_{24}O_3$ (324.42) Calculated: C - 77.76%; H - 7.45% Found: C - 77.90%; H - 7.52%

EXAMPLE 23

Using a procedure analogous to that described in Example 17, 1-acetoxy-3-(2'-chloro-4''-biphenylyl)-butanone-(2), m.p. 61°–62°C (from isopropanol), was prepared in a yield of 54% of theory from 1-hydroxy-3-(2'-chloro-4''-biphenylyl)-butanone-(2) and acetylchloride.

Elemental analysis: $C_{18}H_{17}ClO_3$ (316.79) Calculated: C - 68.25%; H - 5.41%; Cl - 11.19% Found: C - 68.20%; H - 5.44%; Cl - 11.11%

EXAMPLE 24

Using a procedure analogous to that described in Example 17, 1-pivaloyloxy-3-(2'-chloro-4''-biphenylyl)-butanone-(2) was prepared in a yield of 68% of theory from 1-hydroxy-3-(2'-chloro-4''-biphenylyl)-butanone-(2) and pivalic acid chloride. Purification was by column chromatography on silica gel (activity stage I, grain size: 0.05 to 0.2 mm) with benzene. The compound was an oil, $R_f$-value: 0.7 (Woelm-preprepared silica gel plates F 254/366; eluens: ethylene chloride-/ethyl acetate/glacial acetic acid = 100/30/5).

Elemental analysis: $C_{21}H_{23}ClO_3$ (358.87) Calculated: C - 70.29%; H - 6.46%; Cl - 9.88% Found: C - 70.60%; H - 6.44%; Cl - 9.70%

EXAMPLE 25

Using a procedure analogous to that described in Example 17, 1-(2'-benzofurancarbonyloxy)-3-(2''-fluoro-4'''-biphenylyl)-butanone-(2), m.p. 100°–102°C (from isopropanol), was prepared in a yield of 84% of theory from 1-hydroxy-3-(2'-fluoro-4''-biphenylyl)-butanone-(2) and benzofuran-2-carboxylic acid chloride, and having the formula

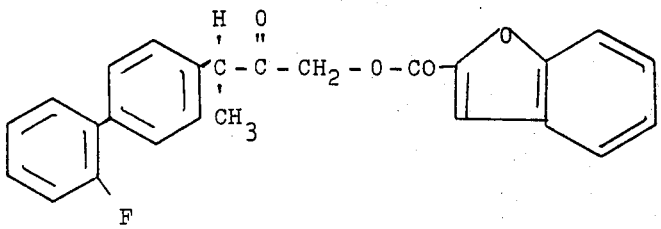

Elemental analysis: $C_{24}H_{19}FO_4$ (390.41) Calculated: C - 73.84%; H - 4.90% Found: C - 73.80%; H - 4.86%

EXAMPLE 26

1-Benzoyloxy-3-(4'-biphenylyl)-propanone-(2) by Method B a. Diazomethyl-4-biphenylylmethyl-ketone 16.8 gm (0.073 mol) of 2-(4'-biphenylyl)-acetylchloride (b.p. of 145°C at 0.4 mm Hg), dissolved in 100 ml of dry benzene were added dropwise while stirring at −10°C to 0.16 mol of diazomethane in 360 ml of ether. After all the nitrogen had been formed, the mixture was stirred for a further 5 hours at 0° to 5°C, and evaporated after standing overnight. The residue was recrystallized from cyclohexane to yield 15.5 gm (90% of theory) of diazomethyl-4-biphenylylmethyl-ketone, m.p. 91°–93°C.

b. 1-Benzoyloxy-3-(4'-biphenylyl)-propanone-(2)

4.7 gm (0.02 mol) of diazomethyl-4-biphenylylmethyl-ketone and 4.9 gm (0.04 mol) of benzoic acid were dissolved in 60 ml of dioxane, 0.4 gm of $CuCl_2$ were added, the mixture was warmed up to 100°C while stirring, whereby nitrogen separated while darkening. The mixture was evaporated in vacuo and the residue was distributed between water and ethyl acetate. The excess of benzoic acid was removed by washing with an aqueous solution of bicarbonate. After drying, evaporating and recrystallization from ethanol, 4.0 gm (61% of theory) were obtained of 1-benzoyloxy-3-(4'-biphenylyl)-propanone-(2) of the formula

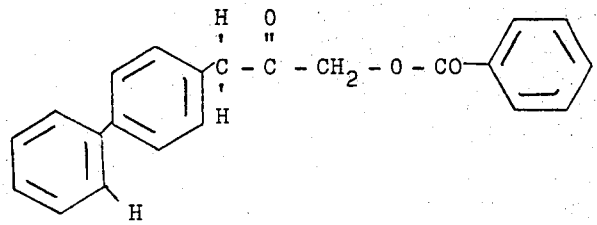

m.p. 110°–112°C.

Elemental analysis: $C_{22}H_{18}O_3$ (330.38) Calculated: C - 79.99%; H - 5.49% Found: C - 80.20%; H - 5.72%

EXAMPLE 27

Using a procedure analogous to that described in Example 17, 1-propionyloxy-3-(4'-biphenylyl)-butanone-(2), m.p. 58°–60°C (from methanol), was prepared in a yield of 82% of theory from 1-hydroxy-3-(4'-biphenylyl)-butanone-(2) and propionic acid chloride. Elemental analysis: $C_{19}H_{20}O_3$ (296.37) Calculated: C - 77.00%; H - 6.80% Found: C - 76.90%; H - 6.88%

EXAMPLE 28

Using a procedure analogous to that described in Example 17, 1-valeroyloxy-3-(4'-biphenylyl)-butanone-(2), m.p. 54°–55°C (from methanol), was prepared in a yield of 81% of theory from 1-hydroxy-3-(4'-biphenylyl)-butanone-(2) and valeric acid chloride.

Elemental analysis: $C_{21}H_{24}O_3$ (324.42) Calculated: C - 77.76%; H - 7.45% Found: C - 77.50%; H - 7.48%

EXAMPLE 29

Using a procedure analogous to that described in Example 17, 1-isovaleroyloxy-3-(4'-biphenylyl)-butanone-(2), m.p. 41°–43°C (from methanol), was prepared in a yield of 82% of theory from 1-hydroxy-3-(4'-biphenylyl)-butanone-(2) and isovaleric acid chloride, and had the formula

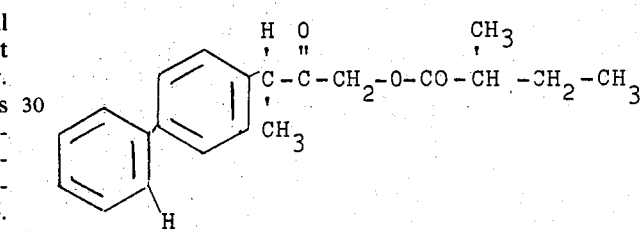

Elemental analysis: $C_{21}H_{24}O_3$ (342.42) Calculated: C - 77.76%; H - 7.45% Found: C - 77.50%; H - 7.46%

EXAMPLE 30

Using a procedure analogous to that described in Example 17, 1-caprinoyloxy-3-(4'-biphenylyl)-butanone-(2), m.p. 46°–48°C (from methanol), was prepared in a yield of 81% of theory from 1-hydroxy-3-(4'-biphenylyl)-butanone-(2) and capric acid chloride, and had the formula

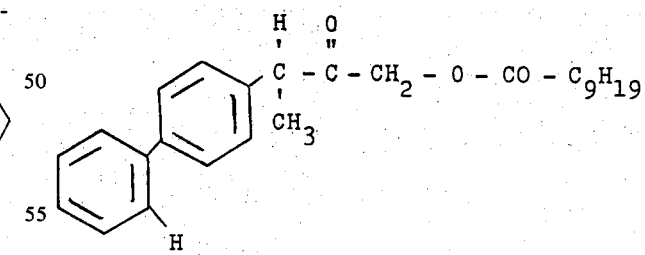

Elemental analysis: $C_{26}H_{34}O_3$ (394.56) Calculated: C - 79.15%; H - 8.68% Found: C - 79.20%; H - 8.70%

EXAMPLE 31

Using a procedure analogous to that described in Example 17, 1-propionyloxy-3-(2'-fluoro-4''-biphenylyl)-butanone-(2) was prepared from 1-hydroxy-3-(2'-fluoro-4''-biphenylyl)-butanone-(2) and propionic acid chloride. The purification was carried out by column chromatography on silica gel (activity stage I, grain size 0.05 to 0.2 mm) with cyclohexane/ethyl/acetate = 5/1. The yield was 45% of theory of an oil, $R_f$- value: 0.70 (Woelm preprepared silica gel plates F 254; eluens: ethylene chloride/ethyl acetate/glacial acetic acid = 100/30/5).

Elemental analysis: $C_{19}H_{19}FO_3$ (314.36) Calculated: C - 72.60%; H - 6.09% Found: C - 72.40%; H - 6.32%

EXAMPLE 32

Using a procedure analogous to that described in Example 17, 1-butyroyloxy-3-(2'-fluoro-4''-biphenylyl)-butanone-(2), was prepared from 1-hydroxy-3-(2'-fluoro-4''-biphenylyl)-butanone-(2) and butyric acid chloride. The purification was effected by column chromatography on silica gel (activity stage I, grain size: 0.05 to 0.2 mm) with cyclohexane/ethyl acetate = 7/1). The yield was 38% of theory of an oil, $R_f$-value: 0.68 (Woelm preprepared silica gel plates F 254; eluens ethylene chloride/ethyl acetate/glacial acetic acid = 100/30/5).

Elemental analysis: $C_{20}H_{21}FO_3$ (328.39) Calculated: C - 73.15%; H - 6.45% Found: C - 73.20%; H - 6.60%

EXAMPLE 33

Using a procedure analogous to that described in Example 17, 1-isovaleroyloxy-3-(2'-fluoro-4''-biphenylyl)-butanone-(2) was prepared from 1-hydroxy-3-(2'-fluoro-4''-biphenylyl)-butanone-(2) and isovaleric acid chloride. The purification was carried out by column chromatography on silica gel (activity stage I, grain size: 0.05 to 0.2 mm) with cyclohexane/ethyl acetate = 7/1. The yield was 41% of theory of an oil with an $R_f$-value: 0.71 (Woelm preprepared silica gel plates F 254; eluens: ethylene chloride/ethyl acetate/glacial acetic acid = 100/30/5).

Elemental analysis: $C_{21}H_{23}FO_3$ (342.41) Calculated: C - 73.66%; H - 6.77% Found: C - 73.95%; H - 7.08%

EXAMPLE 34

Using a procedure analogous to that described in Example 17, 1-caproyloxy-3-(2'-fluoro-4''-biphenylyl)-butanone-(2) was prepared from 1-hydroxy-3-(2'-fluoro-4''-biphenylyl)-butanone-(2) and capronic acid chloride. The purification was effected by column chromatography on silica gel (activity state I, grain size: 0.05 to 0.2 mm) with cyclohexane/ethyl acetate = 7/1. The yield was 29% of theory of an oil, $R_f$-value: 0.70 (Woelm-preprepared silica gel plates F 254; eluens: ethylene chloride/ethyl acetate/glacial acetic acid = 100/30/5) of the formula

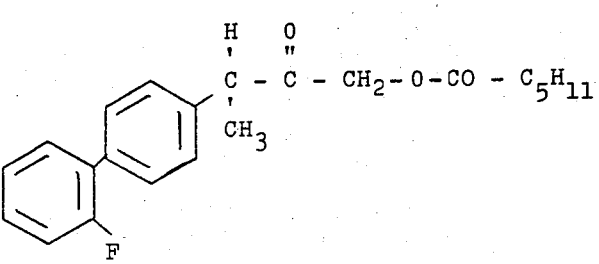

Elemental analysis: $C_{22}H_{25}FO_3$ (356.44) Calculated: C - 74.15%; H - 7.07% Found: C - 74.30%; H - 7.16%

EXAMPLE 35

Using a procedure analogous to that described in Example 17, 1-capryloyloxy-3-(2'-fluoro-4''-biphenylyl)-butanone-(2) was prepared from 1-hydroxy-3-(2'-fluoro-4''-biphenylyl)-butanone-(2) and caprylic acid chloride. The purification was carried out by column chromatography on silica gel (activity stage I, grain size: 0.05 to 0.2 mm) with cyclohexane/ethyl acetate = 8/1. The yield was 24% of theory of an oil, $R_f$-value: 0.74 (Woelm preprepared silica gel plates F 254; eluens: ethylene chloride/ethyl acetate/glacial acetic acid = 100/30/5), having the formula

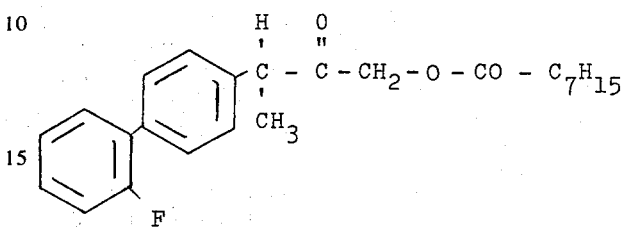

Elemental analysis: $C_{24}H_{29}FO_3$ (384.49) Calculated: C - 74.97%; H - 7.61% Found: C - 75.00%; H - 7.57%

EXAMPLE 36

Using a procedure analogous to that described in Example 17, 1-caprinoyloxy-3-(2'-fluoro-4''-biphenylyl)-butanone-(2) was prepared from 1-hydroxy-3-(2'-fluoro-4''-biphenylyl)-butanone-(2) and capric acid chloride. The purification was carried out by column chromatography on silica gel (activity stage I, grain size: 0.05 to 0.2 mm) with cyclohexane/ethyl acetate = 8/1). The yield was 40% of theory of an oil, $R_f$-value: 0.72 (Woelm preprepared silica gel plates F 254; eluens ethylene chloride/ethyl acetate/glacial acetic acid = 100/30/5).

Elemental analysis: $C_{26}H_{33}FO_3$ (412.55) Calculated: C - 75.70%; H - 8.06% Found: C - 75.90%; H - 8.22%

EXAMPLE 37

Using a procedure analogous to that described in Example 17, 1-undecyloxy-3-(2'-fluoro-4''-biphenylyl)-butanone-(2) was prepared from 1-hydroxy-3-(2'-fluoro-4''-biphenylyl)-butanone and undecylic acid chloride. The purification was carried out by column chromatography on silica gel (activity state I, grain size: 0.05 to 0.2mm) with cyclohexane/ethyl acetate = 8/1). The yield was 46% of theory of an oil, $R_f$-value: 0.73 (Woelm preprepared silica gel plates F 254; eluens ethylene chloride/ethyl acetate/glacial acetic acid = 100/30/5), having the formula

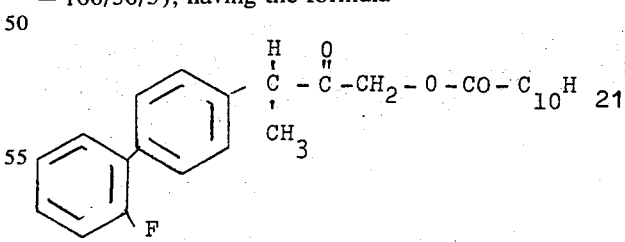

Elemental analysis: $C_{27}H_{35}FO_3$ (426.58) Calculated: C - 76.03%; H - 8.27% Found: C - 76.20%; H - 8.54%

EXAMPLE 38

(+)-1-Isonicotinoyloxy-3-(2'-fluoro-4''-biphenylyl)-butanone-(2) by Method B a. (+)-Diazomethyl-α-(2'-fluoro-4-biphenylyl)-ethylketone 25.4 gm of (+)-2-(2'-fluoro-4''-biphenylyl)-propionic acid ($[\alpha]_D = +53°$ in methanol) were converted into the oily acid chloride by boiling with thionyl chloride. The acid chloride (31.1 gm = 0.118 mol), dissolved in 100 ml of benzene, was added dropwise to a solution of 0.26 mol of diazomethane in 490 ml of ether at a temperature below 10°C. After standing overnight, the mixture was evaporated in vacuo. The remaining oily diazomethyl-α-(2'-fluoro-4-biphenylyl)-ethyl-ketone had a $R_f$-value of 0.6 (Woelm preprepared silica gel plates F 254, eluens: ethylene chloride/ethyl acetate/glacial acetic acid = 100/30/5).

b. (+)-1-Hydroxy-3-(2'-fluoro-4''-biphenylyl)-butanone-(2)

15.8 gm of (+)-diazomethyl-α-(2'-fluoro-4-biphenylyl)-ethyl-ketone were dissolved in 240 ml of dioxane; 180 ml of 2N sulfuric acid were added, and the mixture was heated for 1 hour at 40°C. After all nitrogen had been formed, the solvent was removed in vacuo, the mixture was extracted with ethyl acetate, the organic layer was washed with water, dried and evaporated in vacuo. The oil obtained had an $R_f$-value of 0.48 (Woelm preprepared silica gel plates F 254, eluens: ethylene chloride/ethyl acetate/glacial acetic acid = 100/30/5). The yield was 88% of theory.

c. (+)-1-Isonicotinoyloxy-3-(2'-fluoro-4''-biphenylyl)-butanone-(2) was prepared using a procedure analogous to that described in Example 17 from (+)-1-hydroxy-3-(2'-fluoro-4''-biphenylyl)-butanone-(2) and isonicotinic acid anhydride. The yield was 47% of theory and the compound had a m.p. of 102°C and $[\alpha]_D^{23} = +215°$ in methanol (C = 0.55).

Elemental analysis: $C_{22}H_{18}FNO_3$ (363.35) Calculated: C - 72.71%; H - 4.99%; N - 3.86% Found: C - 72.50%; H - 5.13%; N - 3.86%

EXAMPLE 39

(+)-1-Acetoxy-3-(2'-fluoro-4''-biphenylyl)-butanone-(2) by Method B 15.8 gm of (+)-diazomethyl-α-(2'-fluoro-4-biphenylyl)-ethyl-ketone were heated for 1 hour at 100°C in 115 ml of glacial acetic acid. After all nitrogen had been formed, the mixture was evaporated in vacuo and the residue was purified by chromatography on 500 gm of silica gel (activity stage I, grain size: 0.05 to 0.2 mm) with benzene/ethyl acetate = 19/1. The reaction product was recrystallized from methanol, with m.p. 55°–57°C in a yield of 8.1 gm which was 46% of theory, and $[\alpha]_D^{23} = +188°$ (in methanol (C = 0.57)).

Elemental analysis: $C_{18}H_{17}FO_3$ (300.34) Calculated: C - 71.98%; H - 5.71% Found: C - 71.70%; H - 5.71%

EXAMPLE 40

Using a procedure analogous to that described in Example 39, (−)-1-hydroxy-3-(2'-fluoro-4''-biphenylyl)-butanone-(2) was prepared in a yield of 85% of theory from (−)-diazomethyl-α-(2'-fluoro-4-biphenylyl)-ethyl-ketone [oil, $R_f$-value: 0.6 (Woelm preprepared silica gel plates F 254; eluens: ethylene chloride/ethyl acetate/glacial acetic acid = 100/30/5)]. This compound was an oil, $R_f$-value: 0.50 (Woelm preprepared silica gel plates F 254; eluens: ethylene chloride/ethyl acetate/glacial acetic acid = 100/30/5).

EXAMPLE 41

Using a procedure analogous to that described in Example 17, (−)-1-isonicotinoyloxy-3-(2'-fluoro-4''-biphenylyl)-butanone-(2), m.p. 99°–101°C, was prepared in a yield of 30% of theory from (−)-1-hydroxy-3-(2'-fluoro-4''-biphenylyl-butanone-(2) and isonicotinic acid anhydride. $[\alpha]_D^{23}$ was −217° in methanol (c = 0.47).

Elemental analysis: $C_{22}H_{18}FNO_3$ (363.35) Calculated: C - 72.71%; H - 4.99%; N - 3.86% Found: C - 72.70%; H - 4.97%; N - 3.91%

EXAMPLE 42

Using a procedure analogous to that described in Example 39, (−)-1-acetoxy-3-(2'-fluoro-4''-biphenylyl)-butanone-(2), m.p. 59°–61°C, was prepared in a yield of 21% of theory from (−)-diazomethyl-α-(2'-fluoro-4''-biphenylyl)-ethyl-ketone and glacial acetic acid. $[\alpha]_D^{23}$ was −187° in methanol (c = 0.46).

Elemental analysis: $C_{18}H_{17}FO_3$ (300.34) Calculated: C - 71.98%; H - 5.71% Found: C - 72.20%; H - 5.80%

The pharmacodynamic activities of the compounds of the present invention, namely their antiphlogistic activity with a surprisingly small ulcerogenic side effect, were ascertained in the manner described below. While all of these compounds were found to have these above effective activities, some illustrative test results are shown in the table, wherein A = 1-isonicotinoyloxy-3-(2'-fluoro-4''-biphenylyl)-butanone-(2), B = 1-hydroxy-3-(2'-fluoro-4''-biphenylyl)-butanone-(2), C = 1-hydroxy-3-(2'-fluoro-4''-biphenylyl)-propanone-(2) and D = 1-valeroyloxy-3-(2'-fluoro-4''-biphenylyl)-butanone-(2).

Antiphlogistic activity

The antiphlogistic activity was tested to determine the antiexsudative effect on the kaolin-induced edema (see Hillebrecht in Arzneimittelforschung 4, 607 – 614 (1954)) and the carrageenin-induced edema (see Winter in Proc. Soc. Exper. Biol. Med. 111, 544 (1962)) of the hind paw of the rat after oral administration of at least 3 doses to at least 10 animals per dose. The dose leading to a 35% reduction of the swelling ($ED_{35}$) was graphically determined.

Ulcerogenic activity:

The ulcerogenic activity in the rat was determined after oral administration of the compound for 3 times after 24 hours each time. The animals were killed 4 hours after that and the number of the animals having an ulcer was calculated. The dose which caused an ulcer in 50% of the animals ($ED_{50}$) was graphically determined.

Acute toxicity:

The peroral acute toxicity of the compounds was determined on groups of 10 rats each. The $LD_{50}$, i.e., the dose administered perorally after which 50% of the animals died within a period of 14 days, was calculated according to the method of Litchfield and Wilcoxon.

The results are shown below in Table I.

TABLE I

| Substance | ED₃₅ mgm/kg p.o. kaolin-induced edema | ED₅₀ mgm/kg p.o. carrageenin-induced edema | ED₅₀ mgm/kg p.o. ulcer activity | LD₅₀ mgm/kg p.o |
|---|---|---|---|---|
| A | 14 | 22.5 | 71 | 1,170 |
| B | 22.5 | 22 | 30 | 367 |
| C | 68 | 44 | 70 | 2,040 |
| D | 12.5 | 12 | | 891 |

The compounds according to the present invention or optically active antipodes thereof, embraced by formula I above, have useful pharmacodynamic properties. More particularly, the compounds of the present invention exhibit antiphlogistic activity with surprisingly small ulcerogenic side effects in warm-blooded animals, such as rats.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective single dosage unit of the compounds according to the present invention is from 1.67 to 6.67 mgm/kg body weight, preferably 2.5 to 5.0 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 43

Tablets

The tablet composition was compounded from the following ingredients:

| | | |
|---|---|---|
| 1-isonicotinoyloxy-3-(2'-fluoro-4''-biphenylyl)-butanone-(2) | 200.0 | parts |
| Corn starch | 97.0 | '' |
| Polyvinyl pyrrolidone | 10.0 | '' |
| Magnesium stearate | 3.0 | '' |
| Total | 310.0 | parts |

Preparation:

The mixture of active ingredient with corn starch was granulated by passing through a 1.5 mm screen with an aqueous 14% solution of polyvinylpyrrolidone, dried at 45°C and again passed through the said screen. The granulate thus prepared was mixed with magnesium stearate and compressed into 310 mgm tablets. Each tablet contained 200 mgm of the ketone compound, and was an oral dosage unit composition with effective antiphlogistic activity.

EXAMPLE 44

Coated tablets

The tablet core composition was compounded from the following ingredients:

| | | |
|---|---|---|
| 1-hydroxy-3-(2'-fluoro-4''-biphenylyl)-butanone-(2) | 200.0 | parts |
| Corn starch | 70.0 | '' |
| Gelatin | 8.0 | '' |
| Talcum | 18.0 | '' |
| Magnesium stearate | 4.0 | '' |
| Total | 300.0 | parts |

Preparation

A mixture of the active ingredient with corn starch was granulated by passing it through a 1.5 mm screen with an aqueous 10% solution of the gelatin, dried at 45°C, and again passed through said screen. The granulate obtained was mixed with talcum and magnesium stearate and compressed to form the tablet cores, each having a weight of 300 mgm. The tablet cores were coated in known manner with a coating primarily of sugar and talcum and then polished with beeswax. Each coated tablet weighed 580 mgm and contained 200 mgm of the ketone compound, and was an oral dosage unit composition with effective antiphlogistic activity.

EXAMPLE 45

Gelatin capsules

The capsule contents were compounded from the following ingredients:

| | | |
|---|---|---|
| 1-hydroxy-3-(2'-fluoro-4''-biphenylyl)-propanone-(2) | 200.0 | parts |
| Corn starch | 190.0 | '' |
| Aerosil | 6.0 | '' |
| Magnesium stearate | 4.0 | '' |
| Total | 400.0 | parts |

Preparation

The ingredients were homogeneously mixed and 400 mgm portions were filled into size No. 1 gelatin capsules. Each gelatin capsule contained 200 mgm of the ketone compound and was an oral dosage unit composition with effective antiphlogistic activity.

EXAMPLE 46

Suppositories

The suppository composition was compounded from the following ingredients:

| | | |
|---|---|---|
| 1-valeroyloxy-3-(2'-fluoro-4''-biphenylyl)-butanone-(2) | 100.0 | parts |
| Suppository base (e.g. cocoa butter) | 1450.0 | '' |
| Total | 1550.0 | parts |

Preparations

The active ingredient was finely powdered and stirred into the molten suppository base at 40°C, using an immersion homogenizer. 1550 mgm portions of the mixture at 38°C were poured into cooled suppository molds and allowed to cool therein. Each suppository contained 100 mgm of the ketone compound and was a rectal dosage unit composition with effective antiphlogistic activity.

Analogous results are obtained when any one of the other compounds embraced by formula I or an optically active antipode thereof is substituted for the particular ketone in Example 43 through 46. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

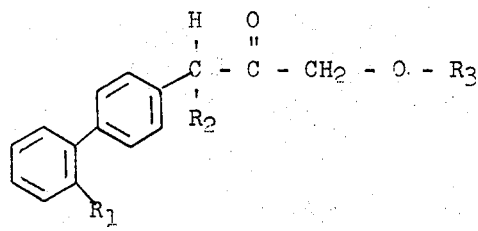

wherein
$R_1$ is hydrogen, fluoro or chloro,
$R_2$ is hydrogen or lower alkyl of 1 to 3 carbon atoms and
$R_3$ is nicotinoyl or isonicotinoyl,
or an optically active antipode thereof.

2. A compound according to claim 1, which is 1-isonicotinoyloxy-3-(2'-fluoro-4''-biphenylyl)-butanone-(2), or an optically active antipode thereof.

* * * * *